(12) United States Patent
Penzenstadler et al.

(10) Patent No.: US 9,031,708 B2
(45) Date of Patent: May 12, 2015

(54) UTILITY INTERACTIVE INVERTER WITH VAR DISPATCH CAPABILITIES

(75) Inventors: Ernest Penzenstadler, Herndon, VA (US); John Sauve, Myersville, MD (US); Guohui Yuan, Gaithersburg, MD (US); Brian Golden, Great Falls, VA (US)

(73) Assignee: GridPoint, Inc., Arlington, VA (US)

( * ) Notice: Subject to any disclaimer, the term of this patent is extended or adjusted under 35 U.S.C. 154(b) by 883 days.

(21) Appl. No.: 12/175,314

(22) Filed: Jul. 17, 2008

(65) Prior Publication Data

US 2009/0024255 A1    Jan. 22, 2009

Related U.S. Application Data

(60) Provisional application No. 60/950,167, filed on Jul. 17, 2007.

(51) Int. Cl.
*G05D 19/00*    (2006.01)
*H02J 3/18*    (2006.01)

(52) U.S. Cl.
CPC ............ *H02J 3/1842* (2013.01); *Y02E 40/22* (2013.01)

(58) Field of Classification Search
CPC ............ G05F 1/70; G05F 5/00; G05B 13/00; Y02E 10/563
USPC ............................ 700/286, 297; 323/205, 207
See application file for complete search history.

(56) References Cited

U.S. PATENT DOCUMENTS

| | | | | |
|---|---|---|---|---|
| 5,369,353 | A | * 11/1994 | Erdman | 323/207 |
| 5,568,399 | A | * 10/1996 | Sumic | 700/293 |
| 2004/0145357 | A1 | * 7/2004 | Lynch et al. | 323/208 |
| 2008/0052145 | A1 | * 2/2008 | Kaplan et al. | 705/8 |

OTHER PUBLICATIONS

Bridges et al., Distributed Energy Storage Management System, filed Dec. 11, 2006, U.S. Appl. No. 60/869,439.*

* cited by examiner

*Primary Examiner* — Mohammad Ali
*Assistant Examiner* — Sheela S Rao
(74) *Attorney, Agent, or Firm* — Greenberg Traurig, LLP

(57) ABSTRACT

A VAR dispatch system. A central control system connected to a network is configured to receive data reflecting local variations in conditions on a power grid and to transmit system control commands over the network. A plurality of VAR dispatch devices are connected to the network and to the power grid. Each VAR dispatch device is configured to detect local variations in conditions on the power grid and to transmit the data reflecting such local variations to the central control system and to receive control commands from the central control system. Each VAR dispatch device is configured to store power and to output stored power to the power grid based on local variations in conditions on the power grid. Each VAR dispatch device is further configured to output stored power to the power grid when the VAR dispatch device receives system control commands from the central control system.

26 Claims, 4 Drawing Sheets

UTILITY INTERACTIVE INVERTER WITH VAR DISPATCH CAPABILITIES

This application claims priority to U.S. Provisional Application Ser. No. 60/950,167 entitled "Utility Interactive Inverter with VAR Dispatch Capabilities" filed Jul. 17, 2007, and relates to the subject matter of U.S. Provisional Patent Application Ser. No. 60/878,072 entitled "Utility Console for Controlling Aggregated Energy Resources" filed Jan. 3, 2007, which are incorporated herein by reference in their entirety.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates in general to the field of electric power distribution systems, and in particular to methods and systems for meeting periodic increases in demand for electric power.

BACKGROUND OF THE INVENTION

Demand on electric power grids can vary significantly depending on conditions existing at any given time. For example, demand for power may increase significantly during a hot summer season due to increased use of air conditioning. During periods of varying demand, voltage is maintained within the grid by various types of equipment within the grid, such as voltage regulators and capacitor banks. Frequency is maintained by matching generation with load. When demand exceeds the available supply, the utility must either purchase power from neighboring interconnects or bring additional (possibly less efficient) generation on line.

Bringing resources online to regulate voltage, for example, switching on capacitor banks, and bringing resources online to supply additional power, for example, purchasing power from another source, can be costly and time consuming. Furthermore, in many cases, monitoring and reacting to voltage instability or generation shortfall must be performed manually, often at or near the source of the problem, and thus grid management is neither centrally controlled or automated.

OBJECTS AND SUMMARY OF THE INVENTION

Therefore, it is an object of the invention to address the problem of periodic power generation shortfalls by sourcing energy to the grid during periods of high demand when the power system may not have enough generating capacity.

It is a further object of the invention to address the problem of outages by providing backup power during an outage by sourcing energy or reactive power to the grid.

It is a further object of the invention to address the problem of periodic voltage instability by sourcing reactive power in Volt Ampere Reactive units (VAR's) to the grid in order to stabilize voltage in the power grid.

It is a further object of the invention to provide the above functions on command from a utility (dispatched centrally through system control) or to allow devices within the power grid to react to power system conditions (such as voltage or frequency) autonomously using advanced algorithms loaded directly on such devices.

In one embodiment, the invention is a VAR dispatch device. The device has a control system connected to a network. The control system is configured to receive system control commands over the network from an external system. A monitoring device is connected to the control system and to a power grid. The monitoring device is configured to detect local variations in conditions on the power grid and communicate the local variations in conditions on the power grid to the control system. The VAR dispatch device further includes at least one power storage device connected to the control system and an energy conversion device connected to the control system, the power storage device, and the power grid. The energy conversion device is configured to input power from the power storage devices and output the power to the grid varying the properties of the power.

The control system is further configured to command the power storage devices and the energy conversion device to output power to the power grid varying at least one property of the power when the control system receives notification of a local variation in conditions on the power grid. The control system is further configured to command the power storage devices and the energy conversion device to output power to the power grid varying at least one property of the power when the control system receives a system control command from the external system commanding the control system to output power to the power grid.

In another embodiment, the invention is a VAR dispatch system. The system has a central control system connected to a network. The control system is configured to receive data reflecting local variations in conditions on a power grid, and is further configured to transmit system control commands over the network. The VAR dispatch system further includes a plurality of VAR dispatch devices. Each VAR dispatch device is connected to the network and to the power grid. Each VAR dispatch device is configured to detect local variations in conditions on the power grid and to transmit the data reflecting local variations in conditions on the power grid to the central control system and to receive control commands from the central control system. Each VAR dispatch device is further configured to store power from at least one source, and to output stored power to the power grid when local variations in conditions on the power grid indicate a local state on the power grid. Each VAR dispatch device is further configured to output stored power to the power grid when the VAR dispatch device receives system control commands from the central control system commanding the device to output stored power to the power grid.

In one embodiment, a VAR dispatch device is controlled by a programmable control system connected to an external network. The device has a power storage device to store electrical power for dispatch to the power grid. The VAR dispatch device has monitoring hardware to enable the device to detect local variations in conditions on the power grid. The device also contains energy conversion hardware to enable the device to output power from the power storage device with varying frequency, voltage, and/or power factors as conditions demand.

In another embodiment, a number of VAR dispatch devices are combined in a network of devices distributed across a power grid. The devices may be programmed to respond autonomously to react to local grid conditions, for example, to stabilize voltage and may also supply a limited quantity of backup power during an outage. The devices may also be controlled centrally from a central control point. The central control point may include one or more computerized systems which use data acquired from the distributed VAR dispatch devices to monitor the operation of the power grid and which are capable of issuing commands to the VAR dispatch devices in response to conditions occurring on the grid.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION OF THE PREFERRED EMBODIMENT

Reference will now be made in detail to the preferred embodiments of the present invention, examples of which are illustrated in the accompanying drawings.

The present invention is described below with operational illustrations of devices and systems for dispatching reactive power to a power grid. It is understood that illustrations may be implemented by means of analog or digital hardware and computer program instructions. These computer program instructions may be provided to a processor of a general purpose computer, special purpose computer, ASIC, or other programmable data processing apparatus, such that the instructions, which execute via the processor of the computer or other programmable data processing apparatus, implements the functions or acts specified in the illustrations.

Figure 1:
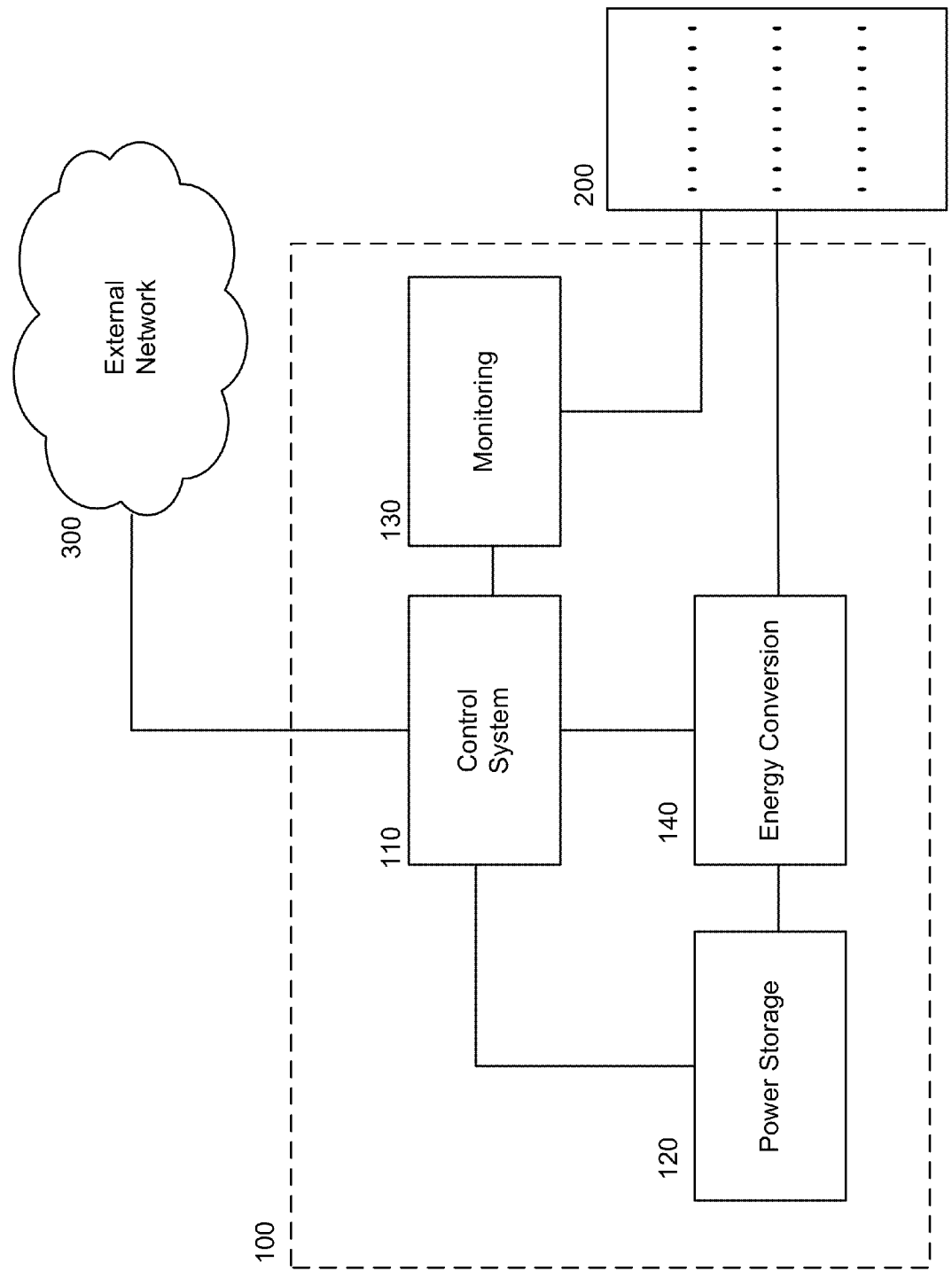
FIG. 1 is a block diagram illustrating one embodiment of a VAR dispatch device.

FIG. 1. illustrates an embodiment of a VAR dispatch device, 100. The device is connected to a power grid, 200, which may be, for example, the power grid of a local utility. The VAR dispatch device, 100, is controlled by a control system, 110, which may be connected to an external network, 300, which can be a wide area network for example, the Internet. The device, 100, has a power storage device, 120, for example, a battery, a capacitor, a fuel cell, or flywheel, to store electrical power for dispatch to the power grid, 200, on demand. The VAR dispatch device has monitoring hardware, 130, to enable the device to detect local variations in conditions on the power grid, 200, for example, variations in voltage. Device 100 also contains energy conversion hardware, 140, for example, an inverter, to enable the device to output power from the power storage device, 120, to the power grid, 200, with varying frequency, voltage, and/or power factors as conditions demand. Energy conversion hardware, 140, may also recharge the power storage from the power grid.

The control system, 110, of the VAR dispatch device, 100, is programmable, and can be programmed to command the device to output AC power at a specific frequency, voltage, and/or power factor based upon rules downloaded to the device or on specific instruction from an authorized source. Rules may be downloaded remotely through an external network, 300, to which the device, 100, is connected.

Figure 2:
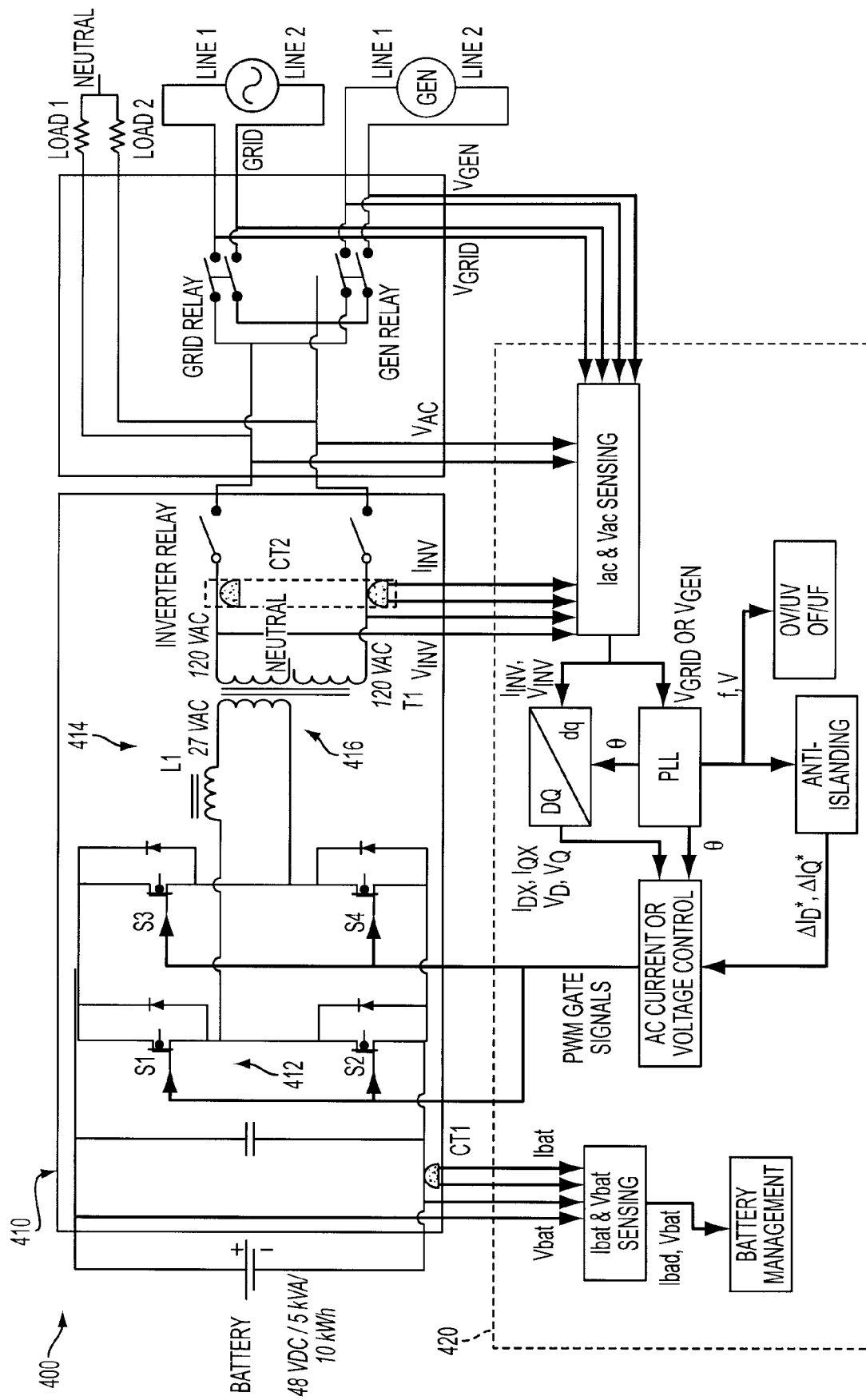
FIG. 2 is a schematic of another embodiment of a VAR dispatch device containing a battery and an inverter.

FIG. 2 illustrates another embodiment of a VAR dispatch device, 400, which includes a battery and an inverter. The inverter, 410, is constructed using an H bridge (S1, S2, S3 and S4), 412, a series inductor (L1), 414, and transformer (T1), 416. The control system, 420, is a conventional field oriented controller that converts sinusoidal signals to direct (ID or VD) and quadrature (IQ or VQ) components. A PLL (phase locked loop) synchronizes to the AC line and generates a phase signal θ. The control system, 420, also includes provision for island detection, voltage and frequency range detection. These are safety devices that disconnect the inverter in the event of a loss of grid. The anti-island system operates by injecting positive feedback and monitoring the output voltage of the inverter.

Figure 3:
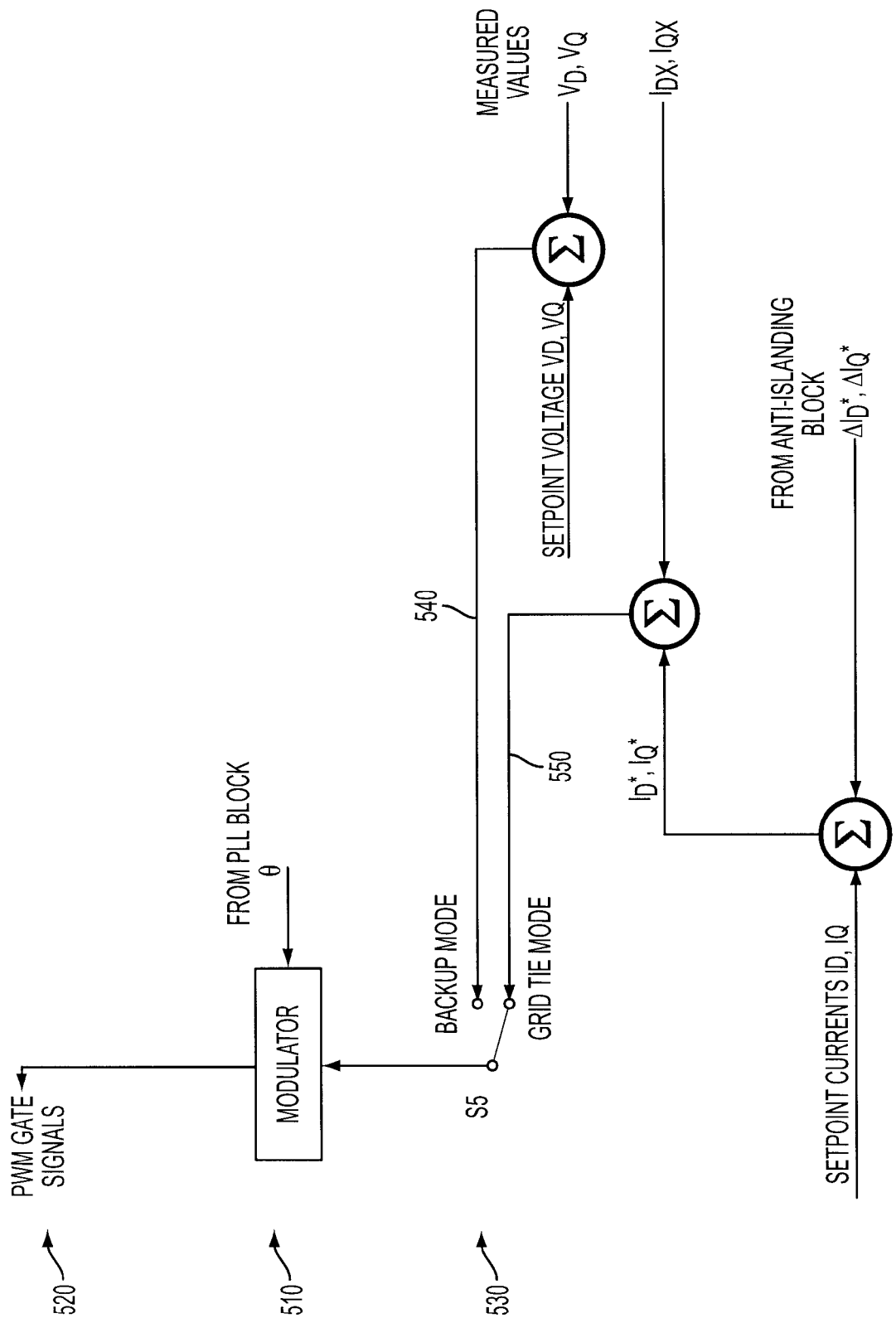
FIG. 3 is a schematic of the closed loop control circuitry of the embodiment shown in FIG. 2.

Closed loop control is performed by components in FIG. 3. The measured values are compared to commanded values to generate an error signal that drives the modulator, 510, which generates PWM gate signals, 520. The D quantity controls the real power delivered by the inverter, 410, and the Q quantity controls the reactive power supplied by the inverter. To operate the inverter, 410, in backup mode the switch S5, 530, connects the modulator, 510, to input the voltage error signal, 540, instead of the current error signal, 550.

Figure 4:
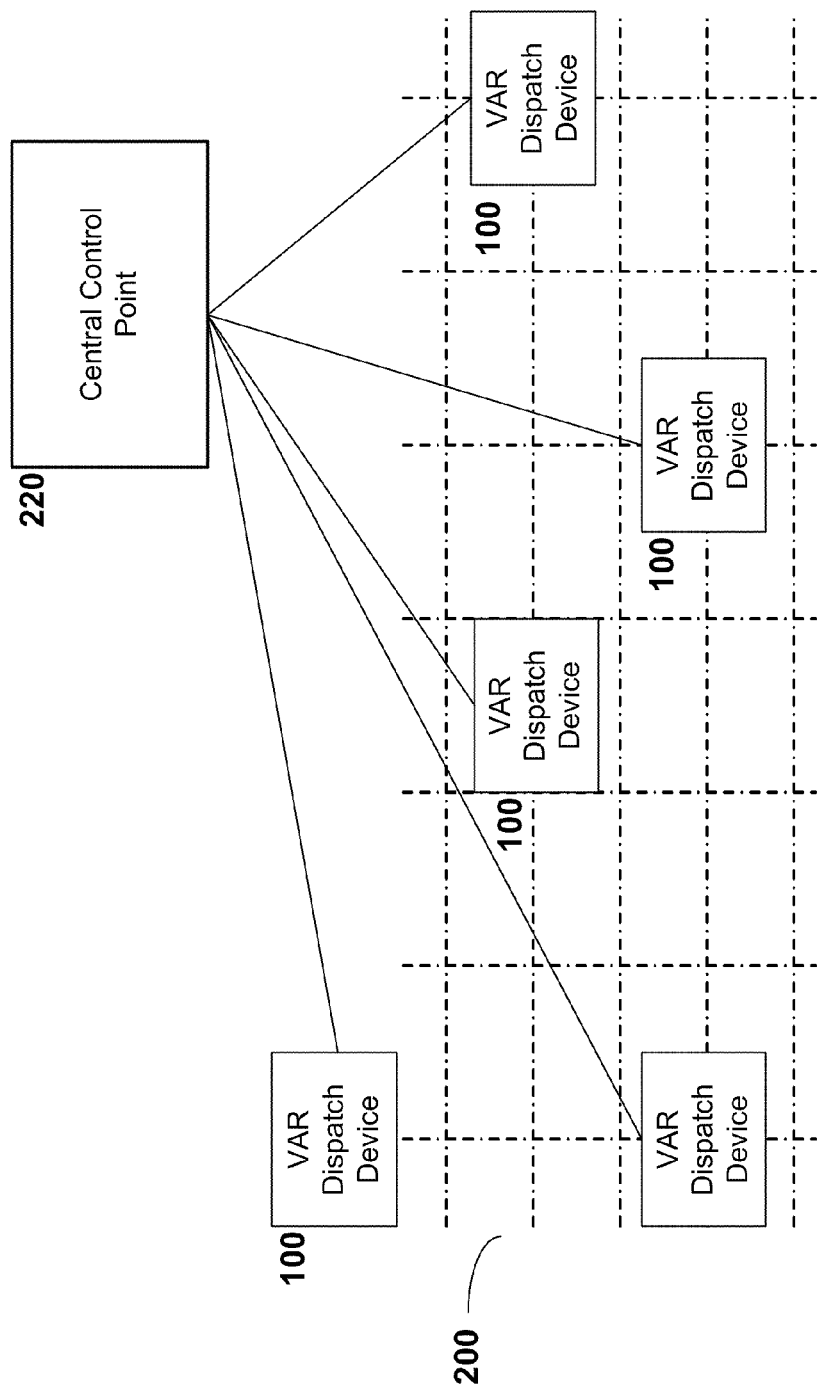
FIG. 4 is a diagram of an embodiment where multiple VAR dispatch devices are used across a power grid and centrally controlled.

Referring next to FIG. 4, in another embodiment, a number of VAR dispatch devices, 100, may be combined in a network of devices distributed across a power grid, 200. Individual devices, 100, are located near the load they are intended to support. The devices, 100, may be programmed to respond autonomously to react to local grid conditions, for example, to stabilize voltage. Since the devices, 100, are located near the load they are intended to support, the devices may also supply a limited quantity of backup power during an outage.

The devices may also be controlled centrally by, for example, the utility responsible for the power grid, 200, from a central control point, 220. The central control point may include one or more computerized systems which use data acquired from the distributed VAR dispatch devices, 100, to monitor the operation of the power grid, 200, and which are capable of issuing commands to the VAR dispatch devices. When overall grid conditions become unstable, the control point, 220, could issue commands to one or more VAR dispatch devices to perform certain actions, for example, dispatch power to an area of the grid even if local grid conditions would not normally trigger the device to do so. Such commands could further specify the rate at which the VAR dispatch devices should operate. Each VAR dispatch device, 100, can measure and report conditions of the grid back to central control point, 220, thus forming a monitoring network to a utility SCADA system.

The central control point, 220, can additionally, communicate with, and control, other central control points managing other VAR dispatch devices. In one embodiment, the central control point communicates with other central control points as if such other central control points were VAR dispatch devices.

For example, distributed generation in the form of a rotating machine could be controlled by a VAR dispatch device and used by the device to generate additional power on demand. Of course, this would require a fuel source, and would have emissions. Alternatively, a renewable or alternative energy source with a static inverter could be used. Typically payback of these systems is, however, very long.

While the invention has been particularly shown and described with reference to preferred embodiments thereof, it will be understood by those skilled in the art that various changes in form and details may be made therein without departing from the spirit and scope of the invention.

We claim:

1. A volt ampere reactive (VAR) dispatch device comprising:

a control system connected to a network, wherein the control system is configured to receive system control commands over the network from an external system;

a monitoring device operatively connected to the control system and to a power grid, wherein the monitoring device is configured to detect local variations in conditions on the power grid and wherein the monitoring device is further configured to communicate the local variations in conditions on the power grid to the control system;

at least one power storage device operatively connected to the control system;

an energy conversion device operatively connected to the control system, the power storage device, and the power grid, wherein the energy conversion device is configured to input power from the at least one power storage device and output the power to the grid varying at least one property of the power, wherein the energy conversion device is a VAR device configured to vary the power factor of the power output to the grid, wherein the control system is further configured to autonomously command the at least one power storage device and the energy conversion device to output the power to the power grid varying the at least one property of the power based on a local variation in conditions on the power grid that indicate a state of the power grid, wherein the control system is further configured to command the at least one power storage device and the energy conversion device to output the power to the power grid varying the at least one property of the power based on a system control command from the external system commanding the control system to output power to the power grid, and wherein the control system, the monitoring device, the at least one power storage device, and the energy conversion device are located proximate to a local portion of the power grid whose variations are being detected.

2. The volt ampere reactive (VAR) dispatch device of claim 1 wherein the network is a wide area network and the external system is a central control system of an entity which manages the power grid.

3. The volt ampere reactive (VAR) dispatch device of claim 1 wherein the control system is further configured to transmit, over the network, the local the variations in conditions on the power grid received from the monitoring device to the external system.

4. The volt ampere reactive (VAR) dispatch device of claim 1 wherein the at least one property of the power is selected from the list: frequency, voltage, power factor.

5. The volt ampere reactive (VAR) dispatch device of claim 1 wherein the at least one power storage device is selected from the list: battery, capacitor, fuel cell, flywheel.

6. The volt ampere reactive (VAR) dispatch device of claim 1 wherein the state of the power grid is selected from the list: grid instability, insufficient power on power grid, loss of power on the power grid.

7. The volt ampere reactive (VAR) dispatch device of claim 1 wherein the control system is further configured to command the energy conversion device to recharge at least one power storage device with power from the power grid.

8. The volt ampere reactive (VAR) dispatch device of claim 1 wherein the control system is programmable and is further configured to command the at least one power storage device and the energy conversion device to output power to the power grid with a specific at least one property when a specific state occurs on the power grid based on rules downloaded to the control system over the network from the external system.

9. The volt ampere reactive (VAR) dispatch device of claim 8, wherein the wherein the system control commands from the external system are indicative of unstable overall grid conditions and the control system is further configured to command the at least one power storage device and the energy conversion device to output the power to the power grid varying the at least one property of the power based on the system control command from the external system even in cases where the local grid conditions do not trigger the control system to autonomously command the at least one power storage device and the energy conversion device to output the power to the power grid varying the at least one property of the power.

10. The volt ampere reactive (VAR) dispatch device of claim 1 wherein the energy conversion device is an inverter.

11. The volt ampere reactive (VAR) dispatch device of claim 10 wherein the energy conversion device is an inverter comprising an H bridge, a series inductor, and a transformer.

12. The volt ampere reactive (VAR) dispatch device of claim 10 wherein the inverter further comprises a closed loop control configured to compare at least one measured value to at least one commanded value to generate an error signal, wherein the error signal causes a modulator within the inverter to generate at least one PWM gate signal controlling the power input to the inverter and the power output by the inverter.

13. The volt ampere reactive (VAR) dispatch device of claim 1 wherein the control system is a conventional field oriented controller configured to convert sinusoidal signals to direct and quadrature components.

14. The volt ampere reactive (VAR) dispatch device of claim 1 wherein the control system is further configured for island detection, voltage range detection and frequency range detection.

15. The volt ampere reactive (VAR) dispatch device of claim 14 wherein the control system is further configured to disconnect the energy conversion device from the power grid if the grid fails.

16. A volt ampere reactive (VAR) dispatch system comprising:

a central control system connected to a network, wherein the control system is configured to receive data reflecting local variations in conditions on a power grid, and wherein the central control system is further configured to transmit system control commands over the network;

a plurality of VAR dispatch devices, each VAR dispatch device being connected to the network and to the power grid, wherein each VAR dispatch device is configured to detect local variations in conditions on the power grid and to transmit the data reflecting local variations in conditions on the power grid to the central control system, wherein each VAR dispatch device is further configured to receive control commands from the central control system, wherein each VAR dispatch device is further configured to store power from at least one source, wherein each VAR dispatch device is further configured through rules downloaded to the VAR dispatch device from the external control system to autonomously output stored power to the power grid when local variations in conditions on the power grid indicate a local state on the power grid, and wherein each VAR dispatch device is further configured to output stored power to the power grid when the VAR dispatch device receives system control commands from the central control system commanding the device to output stored power to the power grid.

17. The volt ampere reactive (VAR) dispatch system of claim 16 wherein the central control system is further configured to use the data reflecting local variations in conditions received from the plurality of VAR dispatch devices to detect at least one condition on the power grid, and wherein the VAR dispatch device is located proximate to a local portion of the power grid.

18. The volt ampere reactive (VAR) dispatch system of claim 17 wherein the central control system is further configured, upon detecting the at least one condition on the power grid, to issue commands to at least one of the plurality of VAR dispatch devices commanding the devices to output stored power to the power grid to mitigate the at least one condition.

19. The volt ampere reactive (VAR) dispatch system of claim 17 wherein the at least one condition is selected from the list: grid instability, high demand for power on the grid, insufficient power on power grid, loss of power on the power grid.

20. The volt ampere reactive (VAR) dispatch system of claim 16 is further configured to issue commands to at least one of the plurality of VAR dispatch devices commanding the devices to set the rate of response under which the at least one of the plurality of VAR dispatch devices should operate.

21. The volt ampere reactive (VAR) dispatch system of claim 16 wherein the local state is selected from the list: grid instability, high demand for power on the grid, insufficient power on power grid, loss of power on the power grid.

22. The volt ampere reactive (VAR) dispatch system of claim 16 wherein at least some of the plurality of VAR dispatch devices are each located near a load and supply backup power to the load during an power grid outage.

23. The volt ampere reactive (VAR) dispatch system of claim 16 wherein at least one of the plurality of VAR dispatch devices is a second central control system of a second VAR dispatch system.

24. The volt ampere reactive (VAR) dispatch system of claim 16, wherein the system control commands from the central control system are indicative of unstable overall grid conditions and each VAR dispatch device is further configured to output stored power to the power grid when the VAR dispatch device receives the central control commands from the central control system commanding the device to output stored power to the power grid even in cases where local variations in conditions on the power grid indicate a local state on the power grid do not trigger the VAR dispatch device to output stored power to the power grid.

25. The volt ampere reactive (VAR) dispatch system of claim 24, wherein the central control system is further configured to use data reflecting local variations in conditions received from the plurality of VAR dispatch devices to detect the unstable overall grid conditions and to generate the system control commands to one or more of the plurality of VAR dispatch devices.

26. A volt ampere reactive (VAR) dispatch device comprising:

a control system connected to a network, wherein the control system is configured to receive system control commands over the network from an external system;

a monitoring device operatively connected to the control system and to a local portion of a power grid proximately located to the volt ampere reactive (VAR) dispatch device, wherein the monitoring device is configured to detect local variations in conditions on the power grid and wherein the monitoring device is further configured to communicate the local variations in conditions on the local portion of the power grid to the control system;

at least one power storage device operatively connected to the control system;

an energy conversion device operatively connected to the control system, the power storage device, and the local portions of the power grid, wherein the energy conversion device is configured to input power from the at least one power storage device and output the power to the local portion of the power grid varying at least one property of the power, wherein the control system is further configured to command the power storage device and the energy conversion device to output the power to the power grid varying the at least one property of the power when the control system receives a system control command from the external system commanding the control system to output power to the power grid;

wherein the control system is further configured to autonomously command the power storage device and the energy conversion device to output the power to the power grid varying the at least one property of the power, and wherein autonomous command is based on downloaded rules that determine how to respond to local grid conditions measured by the monitoring device.

* * * * *